United States Patent [19]

Ohnishi et al.

[11] Patent Number: 5,036,245
[45] Date of Patent: Jul. 30, 1991

[54] ULTRASONIC LINEAR MOTOR

[75] Inventors: Kazumasa Ohnishi; Toru Nakazawa, both of Nagaoka; Yukimitsu Manabe, Niigata, all of Japan

[73] Assignee: Alps Electric Co., Ltd., Tokyo, Japan

[21] Appl. No.: 435,321

[22] Filed: Nov. 13, 1989

[30] Foreign Application Priority Data

Dec. 5, 1988 [JP] Japan .................. 63-158158

[51] Int. Cl.$^5$ .............................. H01L 41/08
[52] U.S. Cl. ..................... 310/323; 310/326; 310/345
[58] Field of Search .............. 310/323, 328, 345

[56] References Cited

U.S. PATENT DOCUMENTS

| 2,278,966 | 4/1942 | Williams | 310/345 X |
| 3,375,707 | 4/1968 | Neitz | 310/345 X |
| 4,562,374 | 12/1985 | Sashida | 310/323 |
| 4,857,791 | 8/1989 | Uchino et al. | 310/323 X |

FOREIGN PATENT DOCUMENTS 0222466 5/1985 Fed. Rep. of Germany ...... 310/323

Primary Examiner—Mark O. Budd
Attorney, Agent, or Firm—Guy W. Shoup; David W. Heid

[57] ABSTRACT

An ultrasonic linear motor including a traveling member having a columnar leg portion abutting at its one end against a traveling surface, and a piezoelectric element mounted on the traveling member for vibrating the leg portion in a direction intersecting an axis of the leg portion. A cover is provided around the traveling member for covering the traveling member and a protecting member is filled inside the cover in such a manner as to fully cover the piezoelectric element for protecting the piezoelectric element from an external environment, whereby the piezoelectric element can be protected from the external environment, and the separation of the piezoelectric element from the traveling member can be prevented. In another aspect, a protector cover is mounted on the traveling member in such a manner as to extend forwardly beyond the piezoelectric element in a direction of movement of the traveling member, whereby even when the protector cover collides with an external member, the damage of the piezoelectric element can be prevented.

3 Claims, 4 Drawing Sheets

ULTRASONIC LINEAR MOTOR

BACKGROUND OF THE INVENTION

The present invention relates to an ultrasonic linear motor suitable for a driving source in an electronic equipment and a precision machine.

Electronic equipments and precision machines require an actuator which can be mounted in a small space and can effect precise positioning. Particularly when linear movement is required, a linear motor rather than a rotary actuator is preferred because the former does not require a mechanism for converting a direction of motion.

FIGS. 7A to 7E show the operation of an inchworm mechanism conventionally proposed as such a linear motor. The inchworm mechanism is constructed of a shaft 31 and a tubular traveling body 32 axially movably engaged with the shaft 31. The traveling body 32 is composed of three tubular members (piezoelectric actuators) 33, 34 and 35 which are bonded together at respective axial ends by adhesive or the like. The central tubular member 33 is a piezoelectric actuator capable of axially expanding and contracting, and the opposite tubular members 34 and 35 are piezoelectric actuators capable of radially expanding and contracting. In operation, when the traveling body 32 is intended to be moved rightwardly, for example, as viewed in FIG. 7(a), the left tubular member 34 is radially contracted to grasp the shaft 31 under the condition where the central tubular member 33 is axially contracted and the right tubular member 35 is radially expanded (see FIG. 7(b). Then, the central tubular member 33 is axially expanded to thereby rightwardly move the right tubular member 35 (see FIG. 7(c). Then, the right tubular member 35 is radially contracted to grasp the shaft 31, and the left tubular member 34 is expanded to be loosened (see FIG. 7(d). Then, the central tubular member 33 is axially contracted to thereby rightwardly move the left tubular member 34 (see FIG. 7(e). Accordingly, the traveling body 32 can be rightwardly moved by repeating the above operation.

However, in the above-mentioned inchworm mechanism, annular gaps between the shaft 31 and the opposite tubular members 34 and 35 must be precisely controlled, so that a high machining accuracy of the shaft 31 is required. However, it is very hard to machine a long shaft with a high accuracy. Accordingly, a manufacturing cost will become very high, or a distance of movement of the traveling body will be limited.

Furthermore, the shaft 31 is grasped by a compressive stress of the tubular members 34 and 35. Therefore, when the piezoelectric actuators are vibrated at a high frequency such as a resonance frequency of the members, the tubular members 34 and 35 are broken to cause a reduction in efficiency of the motor.

FIG. 6 shows another type linear motor improved in efficiency proposed by the present applicant (Japanese Patent Application No. 63-60714). The prior art linear motor does not require a high machining accuracy, and can move a long distance, utilizing a resonance condition of components. The linear motor is comprised of a traveling member (vibrating member) 24 formed of an elastic material and a pair of piezoelectric elements 26 and 27 bonded by adhesive or the like to a pair of mounting surfaces 25 formed at opposite corners of the traveling member 24. The traveling member 24 has an inverted U-shape formed by a pair of leg portions 21 and 22 arranged in perpendicular relationship to a longitudinal direction of a rail R and by a body portion 23 connecting the leg portions 21 and 22. The leg portions 21 and 22 and the body portion 23 are vibrated by the piezoelectric elements 25 and 27 with the phases of vibration being suitably shifted, so that the traveling member 24 can be moved on the rail R.

However, the above linear motor has the following shortcomings. First, the piezoelectric elements 26 and 27 formed of ceramics are low in moisture resistance. Accordingly, in the case that the linear motor is used in the environment such as a high-humidity environment and a dusty environment, a service life of the piezoelectric elements 26 and 27 will be reduced. Second, as the piezoelectric elements 26 and 27 project from the mounting surfaces 25 of the traveling member 24, there is a possibility that the forward ends of the piezoelectric elements 26 and 27 will collide with an external member such as a wall during traveling of the traveling member 24, causing the breakage of the piezoelectric elements 26 and 27.

SUMMARY OF THE INVENTION

It is an object of the present invention to provide an ultrasonic linear motor including a piezoelectric element which may be protected from an external environment and thereby improve the reliability.

It is another object of the present invention to provide an ultrasonic linear motor including a piezoelectric element which may be prevented from being separated from the traveling member.

It is a further object of the present invention to provide an ultrasonic linear motor including a piezoelectric element which may be prevented from being damaged even when an impact is received.

According to one aspect of the present invention, there is provided in an ultrasonic linear motor including a traveling member having a columnar leg portion abutting at its one end against a traveling surface, and a piezoelectric element mounted on said traveling member for vibrating said leg portion in a direction intersecting an axis of said leg portion; the improvement comprising a cover provided around said traveling member for covering said traveling member and a protecting member filled inside said cover in such a manner as to fully cover said piezoelectric element for protecting said piezoelectric element from an external environment.

With this arrangement, as the piezoelectric element is covered with the protecting member filled inside the cover, the piezoelectric element is not affected by the external environment such as a high-humidity environment and a dusty environment. Accordingly, the service life of the piezoelectric element can be extended, and the ultrasonic linear motor can be used for general purpose with no dependency upon the external environment. Further, as the piezoelectric element is held by the protecting member, the separation of the piezoelectric element from the traveling member can be prevented to thereby improve the reliability of the motor.

According to another aspect of the present invention, there is provided in an ultrasonic linear motor including a traveling member having a columnar leg portion abutting at its one end against a traveling surface, and a piezoelectric element mounted on said traveling member for vibrating said leg portion in a direction intersecting an axis of said leg portion; the improvement comprising a cover mounted on said traveling member in such a manner as to extend forwardly beyond said piezoelectric element in a direction of movement of said traveling member.

With this arrangement, as the cover extends forwardly beyond the piezoelectric element in the direction of movement of the traveling member, the piezoelectric element can be prevented from being broken upon collision of the cover with an external member such as a wall.

In the case that a damping member formed of a soft material is provided between the cover and the piezoelectric element, the piezoelectric element is held by the damping member to thereby prevent the separation of the piezoelectric element from the traveling member during traveling. Further, even if the cover is moved relative to the traveling member upon collision with an external member, the damping member is deformed to absorb the movement of the cover, thereby preventing the damage of the piezoelectric element.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
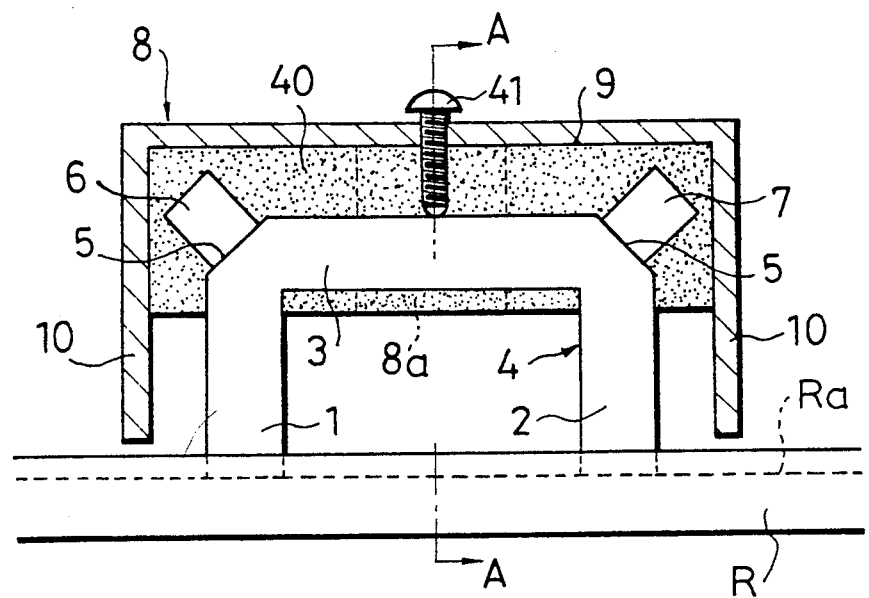
FIG. 1 is an elevational view of a first preferred embodiment of the ultrasonic linear motor according to the present invention.
Figure 2:
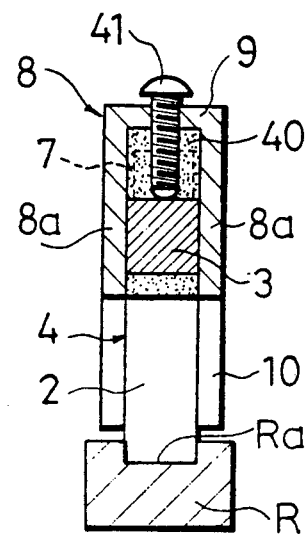
FIG. 2 is a cross section taken along the line 2—2 in FIG. 1.

Referring first to FIGS. 1 and 2 which show a first preferred embodiment of the present invention, the ultrasonic linear motor is comprised of a traveling member 4 and a pair of piezoelectric elements 6 and 7 as a source of vibration for applying vibration to the traveling member 4. The traveling member 4 is constructed of a pair of parallel leg portions 1 and 2 and a body portion 3 integrally connecting base ends (upper ends) of the leg portions 1 and 2 in such a manner as to form a generally inverted U-shape as viewed in FIG. 1. The traveling member 4 is disposed on an upper surface of a fixed rail R formed of steel. The leg portions 1 and 2 and the body portion 3 have a substantially square cross-section. A pair of corners of the inverted U-shaped traveling member 4 are chamfered at an angle of 45 degrees with respect to the leg portions 1 and 2 and the body portion 3, thereby forming a pair of mount surfaces 5 for mounting the pair of piezoelectric elements 6 and 7 through adhesive or the like. The piezoelectric elements 6 and 7 are expanded and contracted in a direction perpendicular to the respective mount surfaces 5 when voltage is applied to the piezoelectric elements 6 and 7.

The traveling member 4 is formed of an elastic material such as aluminum. Examples of the elastic material for the traveling member 4 may include a metal material such as duralumin, iron, brass or stainless steel; an inorganic material such as alumina, glass or silicon carbide; and an organic material such as polyimide resin or nylon. In the preferred embodiment, the traveling member 4 has a size such that the body portion 3 has a side of 5 mm in square cross-section and a length of 26 mm, while the leg portions 1 and 2 have a side of 5 mm in square cross-section and a length of 10 mm. However, the size of the vibrating member may be suitably designed.

The piezoelectric elements 6 and 7 are constructed by a stacked piezoelectric actuator or a single plate piezoelectric ceramic. The piezoelectric elements 6 and 7 have a side of 5 mm in square cross-section and a length of 9 mm in the preferred embodiment.

Reference numeral 8 generally designates a cover so provided as to surround the traveling member 4. The cover 8 is comprised of a cover body 8b having an inverted U-shape and a pair of side plates 8a integrally formed with the cover body 8b. The cover body 8b is constructed of a horizontal plate 9 extending along the upper surface of the body portion 3 of the traveling member 4 and a pair of vertical plates 10 extending downwardly from opposite ends of the horizontal plate 9 toward the rail R. The side plates 8a are formed at a longitudinally central portion of the horizontal plate 9 and extend downwardly from opposite side edges of the horizontal plate 9.

The cover body 8b has a width slightly larger than that of the traveling member 4, and has a length such that there are defined sufficient spaces between the inner surface of the left vertical plate 10 and the piezoelectric element 6 and between the inner surface of the right vertical plate 10 and the piezoelectric element 7. As shown in FIG. 2, the body portion 3 is sandwiched by the side plates 8a extending downwardly from the horizontal plate 9.

Reference numeral 40 designates a silicone rubber as the protecting member according to the present invention. The silicone rubber 40 is filled in an upper inside space of the cover 8, so as to integrally connect the cover 8 with the traveling member 4. Accordingly, the body portion 3 and the piezoelectric elements 6 and 7 are embedded in the silicone rubber 40 so as to be fully protected from the external environment. Reference numeral 41 designates an adjusting screw for adjusting a vertical position of the cover 8 with respect to the traveling member 4.

The ultrasonic linear motor as constructed above is adapted to be moved on the rail R along a traveling surface Ra formed on the rail R. Specifically, the lower ends of the leg portions 1 and 2 of the traveling member 4 are disposed to contact the traveling surface Ra of the rail R. Under the condition, alternating voltages having a resonance frequency identical with that of the traveling member 4 and having different phases are applied to the piezoelectric elements 6 and 7 to generate ultrasonic vibration in the piezoelectric elements 6 and 7.

Accordingly, the traveling member 4 is vibrated at the resonance frequency in both directions intersecting the longitudinal direction of the leg portions 1 and 2 and the longitudinal direction of the body portion 3. That is, the leg portions 1 and 2 are longitudinally vibrated at the resonance frequency in the direction perpendicular to the traveling surface Ra, and at the same time, they are flexurally vibrated at the resonance frequency in the direction along the traveling surface Ra. As a result, the lower ends of the leg portions 1 and 2 are elliptically vibrated at the resonance frequency in the same direction by the synthesis of the longitudinal vibration and the flexural vibration.

When the elliptical vibration is generated at the lower ends of the leg portions 1 and 2 as mentioned above, a contact pressure between the lower ends of the leg portions 1 and 2 and the traveling surface Ra of the rail R is periodically changed with a change in vertical component of the elliptical vibration (component in the longitudinal direction of the leg portions 1 and 2). On the other hand, a horizontal component of the elliptical vibration (component in the longitudinal direction of the rail R) causes the generation of a force of kicking the rail R in its longitudinal direction (which force will be hereinafter referred to as a driving force). The driving force is changed in its direction with a change in phase of the elliptical vibration. The larger the contact pressure (a frictional force) between the lower ends of the leg portions 1 and 2 and the traveling surface Ra of the rail R, the more effectively the driving force is applied. Accordingly, the strength of the driving force is also changed with a change in the contact pressure as well as a change in the driving direction. Thus, the traveling member 4 is moved in one direction.

In the first preferred embodiment, as the piezoelectric elements 6 and 7 are covered with the silicone rubber 40, they are protected from a high-humidity environment and a dusty environment, thereby greatly improving the service life of the piezoelectric elements 6 and 7. Accordingly, the ultrasonic linear motor of the preferred embodiment may be used for general purpose with no dependency on the environment. Further, as the body portion 3 and the piezoelectric elements 6 and 7 are embedded in the silicone rubber 40, the separation of the piezoelectric elements 6 and 7 from the mounting surfaces 5 may be prevented. Accordingly, no special attention is required in handling the ultrasonic linear motor. Additionally, even when the cover 8 collides with a component of the instrument, an impact to be applied to the cover 8 is absorbed by the silicone rubber 40. Accordingly, the piezoelectric elements 6 and 7 may be protected from the impact, thereby greatly improving the reliability of the ultrasonic linear motor.

The silicone rubber 40 as the protecting member may be replaced by any other materials capable of isolating the piezoelectric elements 6 and 7 from the external environment without absorbing the ultrasonic vibration of the piezoelectric elements 6 and 7 and the traveling member 4. For example, various rubbers such as foamed urethane rubber and resins may be used for the protecting member.

Further, the shape of the cover 8 may be appropriately modified to any other shapes such as a box-like shape capable of accommodating the protecting member. Although the traveling member 4 is formed in the inverted U-shape by the two leg portions 1 and 2 and the body portion 3 in the above preferred embodiment, the traveling member 4 may be formed by a single leg portion. Alternatively, the number of the leg portions may be increased to three or more, or the body portion may be curved.

The sizes of the traveling member 4 and the piezoelectric elements 6 and 7 as specified above are exemplary, and they may be appropriately changed according to a manner of use of the ultrasonic linear motor.

Figure 3:
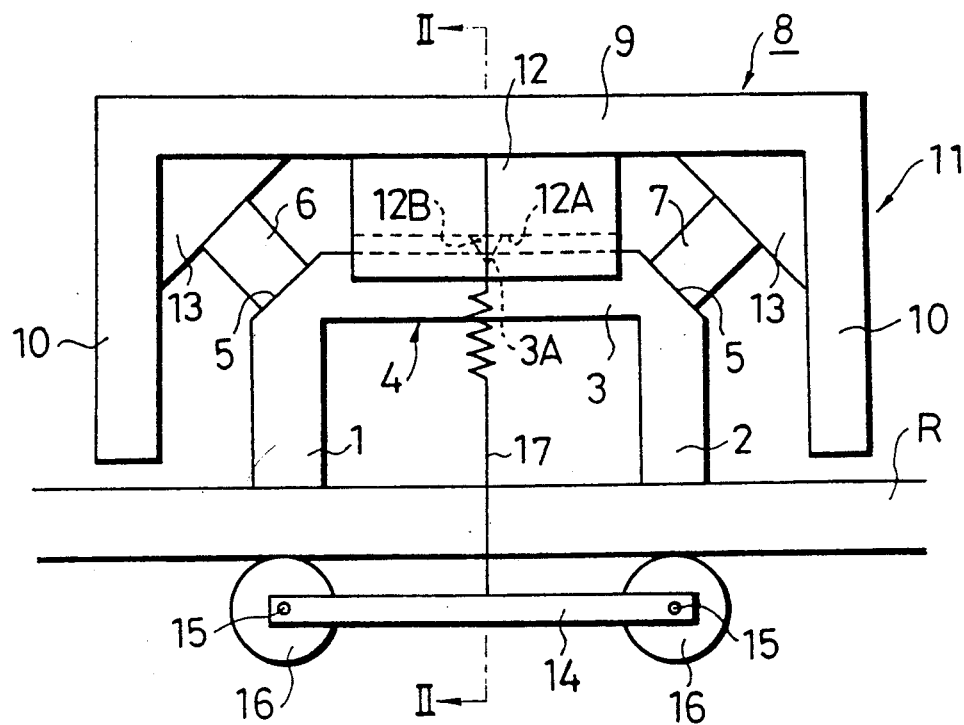
FIG. 3 is an elevational view of a second preferred embodiment of the present invention.
Figure 4:
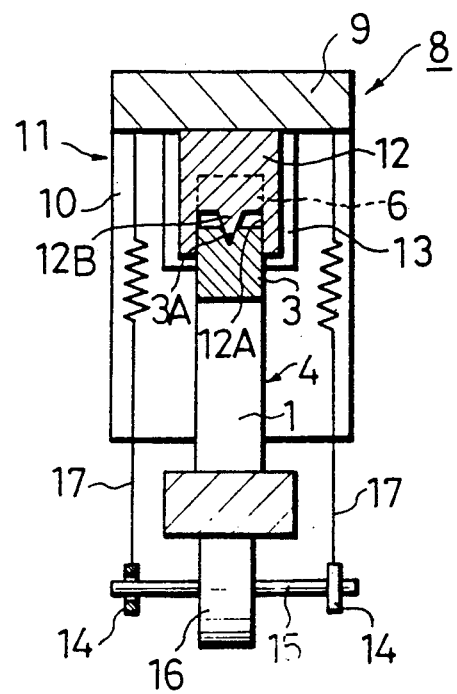
FIG. 4 is a cross section taken along the line 4—4 in FIG. 3.

FIGS. 3 and 4 show a second preferred embodiment of the present invention, wherein the same reference numerals as in the first preferred embodiment denote the same parts, and the structure of the piezoelectric actuator is the same as in the first preferred embodiment. Accordingly, the explanation relating thereto will be omitted.

A pressure cover 8' in the second preferred embodiment is comprised of a cover body 11 having an inverted U-shape and a pressure member 12 having a shape of rectangular prism. The cover body 11 is constructed of a horizontal plate 9' extending along the body portion 3 of the traveling member 4 to the right and left positions (as viewed in FIG. 3) beyond the piezoelectric elements 6 and 7 and a pair of vertical plates 10' extending downwardly from the opposite ends of the horizontal plate 9' toward the rail R. The pressure member 12 is fixed on a lower surface of the horizontal plate 9' at a longitudinally central position thereof. A pair of damping members 13 each having a shape of triangular prism are fixed at the inside corners of the cover body 11. The damping members 13 are formed of a soft material such as rubber and urethane resin. The pressure member 12 is formed on its lower surface with a straight groove 12A having a width slightly larger than that of the body portion 3 of the traveling member 4. A bottom surface of the straight groove 12A is formed at its central position with a projection 12B to be engaged with a recess 3A formed on the upper surface of the body portion 3. Thus, the pressure cover 8' is fixedly disposed on the traveling member 4 by engaging the body portion 3 with the straight groove 12A of the pressure member 12, engaging the recess 3A of the body portion 3 with the projection 12B, and abutting the damping members 13 against the end surfaces of the piezoelectric elements 6 and 7.

A pair of front and rear wheels 16 are provided under the rail R, and are rotatably supported to a pair of front and rear axles 15. The front and rear axles 15 are supported to a pair of right and left supporting frames 14 as viewed in FIG. 4. A pair of coil springs 17 are stretched between the opposite side edges of the horizontal plate 9' and the supporting frames 14 at respective longitudinally central positions, so as to press the lower ends of the leg portions 1 and 2 against the upper surface of the rail R and simultaneously press the front and rear wheels 16 against the lower surface of the rail R. The elastic modulus of the coil springs 17 is suitably selected according to a load to be applied thereto.

In the ultrasonic linear motor as constructed above, the traveling member 4 is moved in the following manner. Assuming that the voltage to be applied to the first piezoelectric element 6 is represented by $V_a = E \cdot \sin \omega t$, the voltage to be applied to the second piezoelectric element 7 is represented by $V_b = E \cdot \sin (\omega t - \pi/2)$. As a result, the vibration to be applied to the leg portions 1 and 2 by the piezoelectric elements 6 and 7 is represented as follows:

The vibration to the first leg portion 1:

$$X_1 = A \cdot \sin (\omega t + \pi/2)$$

$$Y_1 = B \cdot \sin (\omega t + \pi)$$

The vibration to the second leg portion 2:

$$X_2 = A \cdot \sin \omega t$$

$$Y_2 = B \cdot \sin (\omega t + \pi/2)$$

Accordingly, the lower ends of the leg portions 1 and 2 are elliptically vibrated. As the vibration of the first leg portion 1 is different in phase by 90 degrees from the vibration of the second leg portion 2, the lower ends of the leg portions 1 and 2 are alternately pressed against the rail R in one direction. As a result, the traveling member 4 is moved in one direction along the rail R. The direction of the movement of the traveling member 4 can be changed by changing the voltage to be applied to the second piezoelectric element 7 into $V_b = E \cdot \sin (\omega t + \pi/2)$.

In the second preferred embodiment, even when the ultrasonic linear motor collides with an external member such as a wall, the vertical plates 10' of the cover body 11 receives an impact upon collision, and the piezoelectric elements 6 and 7 are prevented from directly colliding with the external member, thus preventing the breakage of the piezoelectric elements 6 and 7.

Furthermore, as the piezoelectric elements 6 and 7 are held between the damping members 13 and the mounting surfaces 5 of the traveling member 4, it is possible to prevent that the piezoelectric elements 6 and 7 will be separated from the mounting surfaces 5 during traveling of the traveling member 4. In addition, even if the cover body 11 is moved relative to the traveling member 4 upon collision, the damping members 13 are deformed to absorb the movement of the cover body 11 since they are formed of a soft material, thereby preventing the damage of the piezoelectric elements 6 and 7.

The traveling member 4 is normally pressed against the upper surface of the rail R by the elastic members 17. Accordingly, even when the frequency of the vibration to be applied to the traveling member 4 is increased, a distance between facing surfaces of the leg portions 1 and 2 and the rail R is less fluctuated, thereby preventing the breakage of the leg portions 1 and 2. In other words, the frequency can be suitably selected.

Further, as the traveling member 4 is elastically held by the elastic members 17, it can be moved on the upper surface of the rail R under the inclined or erected condition of the rail R, or on the lower surface of the rail R. In the case that the traveling member 4 is moved normally on the upper surface of the rail R under the horizontal condition, the leg portions 1 and 2 are urged against the rail R by a deadweight of the linear motor itself serving as a biasing means. Accordingly, the elastic members 17 and the other associated members may be removed in this case.

Although the cover body 11 is formed by the horizontal plate 9' and the vertical plates 10' in the second preferred embodiment, it is sufficient to project the forward ends of the cover body 11 beyond the piezoelectric elements 6 and 7, so that the piezoelectric elements 6 and 7 may be prevented from colliding with an external member. For example, the cover body 11 may be formed by the horizontal plate 9' only.

Further, the inverted U-shape of the cover body 11 in the second preferred embodiment may be replaced by a box-like shape fully covering the traveling member 4 and the piezoelectric elements 6 and 7. In this case, the traveling member 4 and the piezoelectric elements 6 and 7 can be protected from dust or the like.

Figure 5:
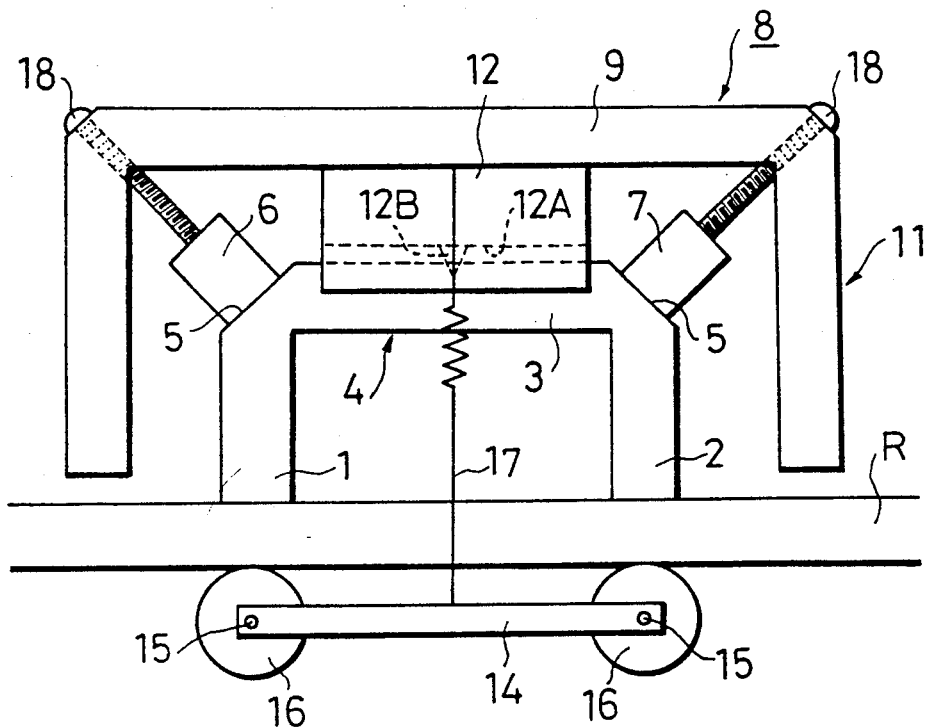
FIG. 5 is an elevational view of a third preferred embodiment of the present invention.
Figure 6:
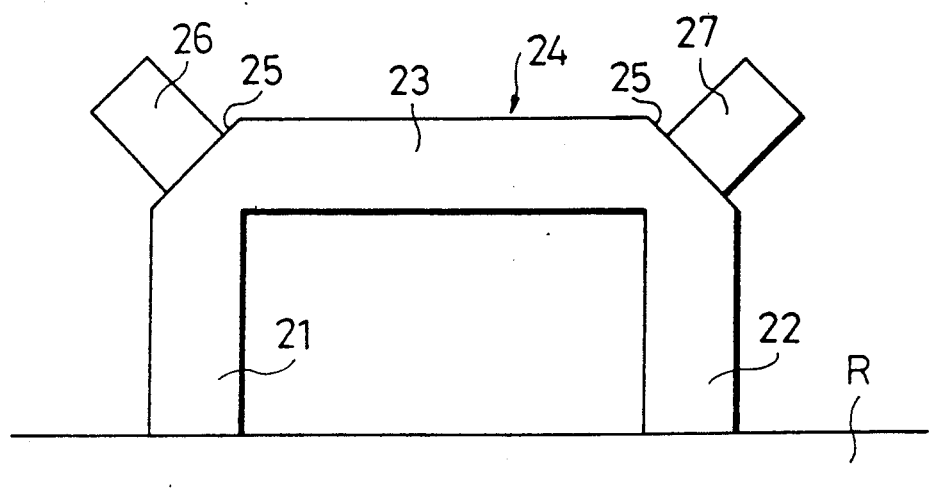
FIG. 6 is an elevational view of an ultrasonic linear motor in the prior art.
Figure 7A:
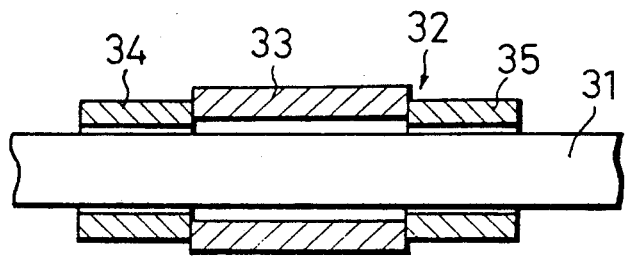
FIGS. 7(a) to 7(e) are sectional views of another type linear motor in the prior art, illustrating the operation thereof.
Figure 7B:
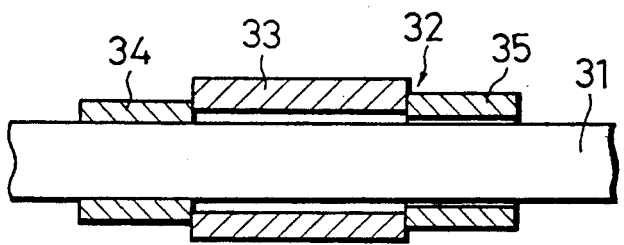
Figure 7C:
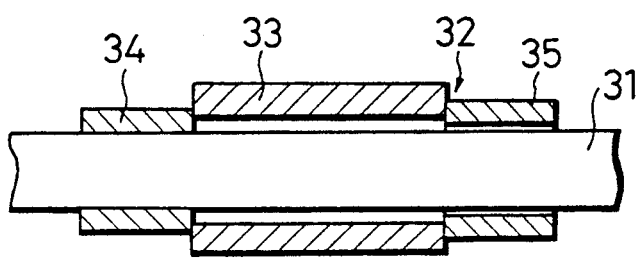
Figure 7D:
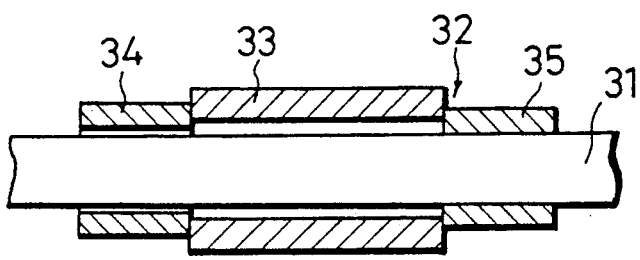
Figure 7E:
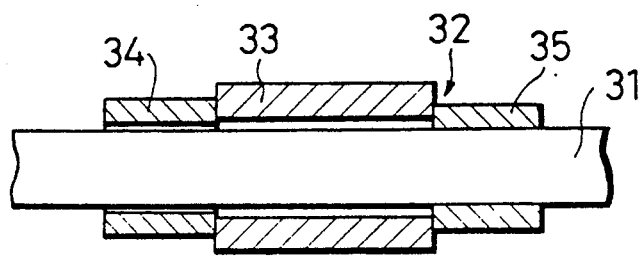
Figure 1:
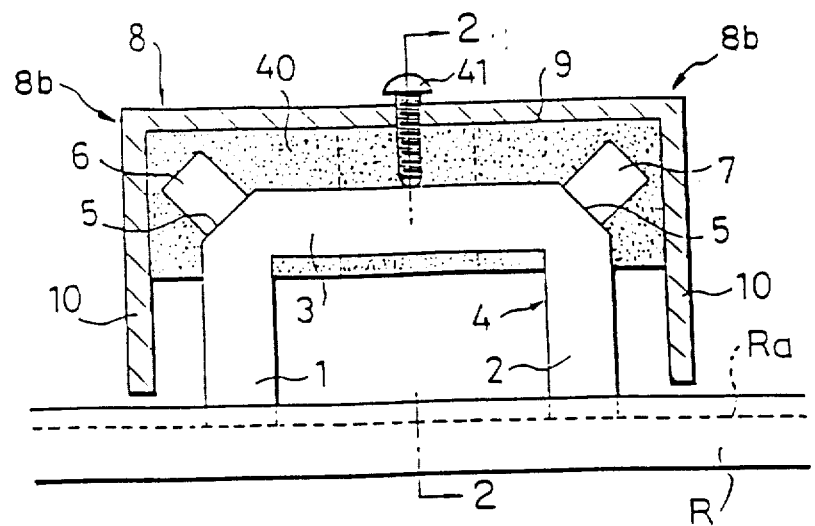
Figure 2:
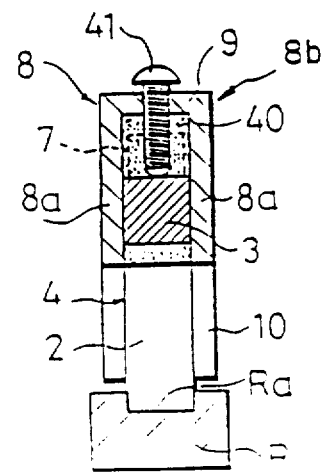
Figure 3:
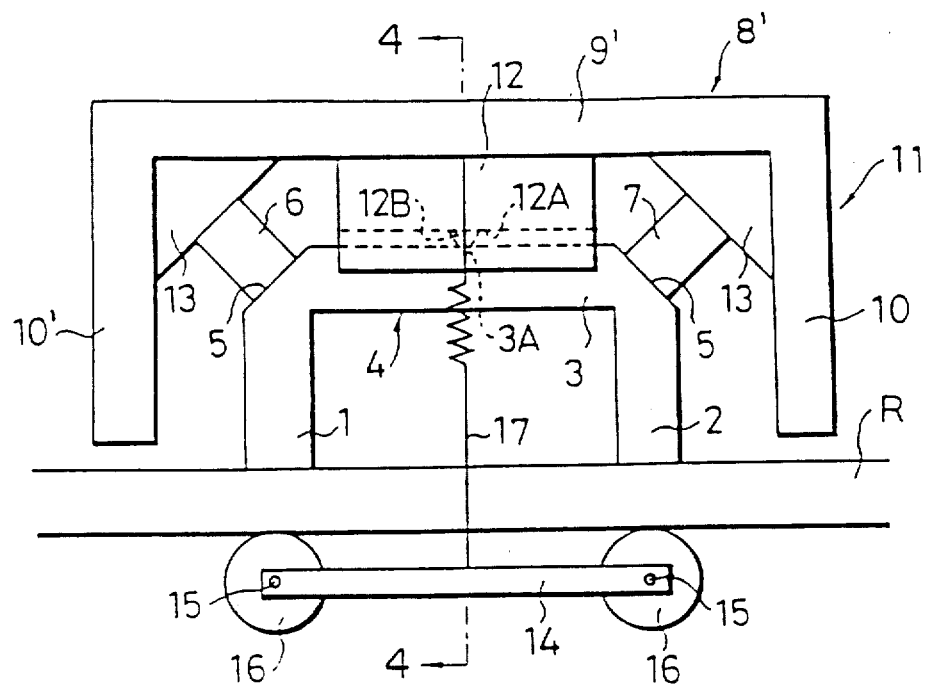
Figure 4:
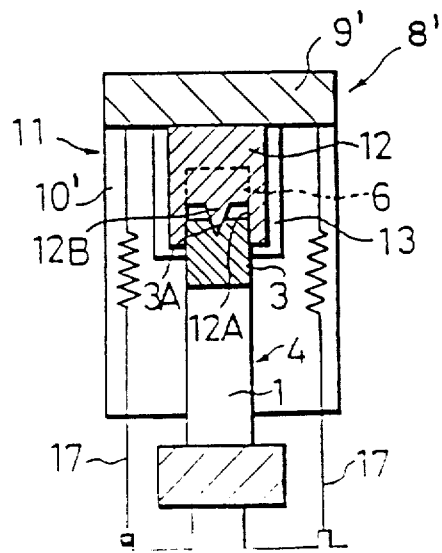
Figure 5:
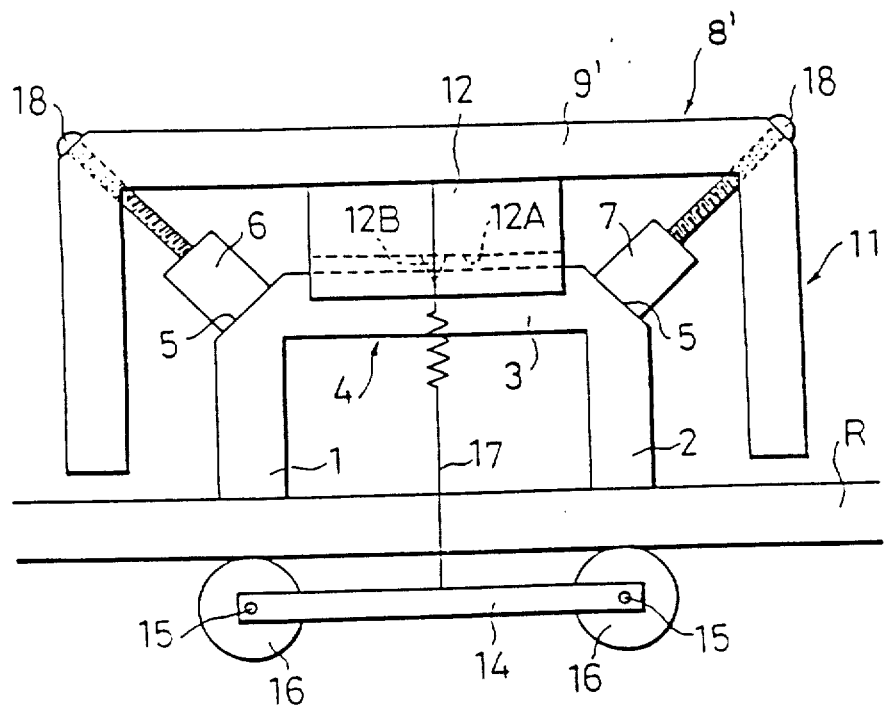

Referring to FIG. 5 which shows a third preferred embodiment of the present invention, a pair of bolts (holding members) 18 formed of synthetic resin or the like are threadedly inserted through both the corners of the cover body 11 instead of the damping members 13 used in the second preferred embodiment. The tips of the bolts 18 abut against the end surfaces of the piezoelectric elements 6 and 7. The other construction is the same as the second preferred embodiment.

In the third preferred embodiment, the piezoelectric elements 6 and 7 are held between the bolts 18 and the mounting surfaces 5 of the traveling member 4 to thereby prevent the separation of the piezoelectric elements 6 and 7 from the mounting surfaces 5 during traveling of the traveling member 4.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

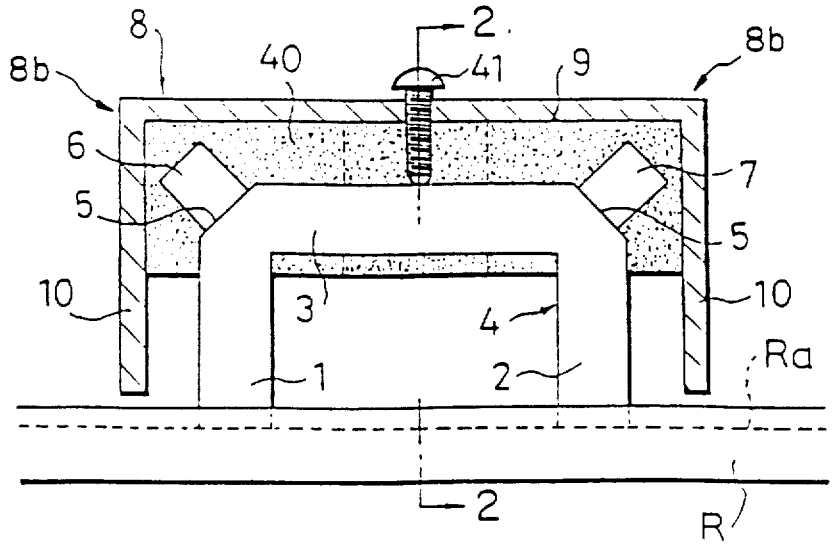

What is claimed is:

1. In an ultrasonic linear motor including a traveling member having columnar leg portions and a body member connecting said leg portions, wherein one end of each said leg portions abuts against a traveling surface, and a pair of piezoelectric elements mounted on opposing end surfaces of said body member for vibrating said leg portions in a direction intersecting an axis of said leg portions; the improvement comprising a cover provided around said traveling member for covering said traveling member and a protecting member filled inside said cover in such a manner as to fully cover said pair of piezoelectric elements for protecting said pair of piezoelectric elements from an external environment, said cover having means for mechanically contacting with said traveling member; wherein said means for mechanically contacting with said traveling member comprises an adjusting screw insertable from said cover through said protecting member to abut with said traveling member.

2. In an ultrasonic linear motor including a traveling member having columnar leg portions and a body member connecting said leg portions, wherein one end of each said leg portion abuts against a traveling surface, and a pair of piezoelectric elements mounted on opposing end surfaces of said body member for vibrating said leg portions in a direction intersecting an axis of said leg portions; the improvement comprising a cover mounted on said traveling member in such a manner as to extend at least forwardly beyond said pair of piezoelectric elements in a direction of movement of said traveling member, said cover having a means for mechanically contacting said traveling member; wherein said means for mechanically contacting with said traveling member comprises a pressure member extending from said cover to contact said traveling member.

3. The ultrasonic linear motor according to claim 2, wherein said cover further comprises a bolt insertable from said cover to abut one of said pair of piezoelectric elements.

* * * * *

UNITED STATES PATENT AND TRADEMARK OFFICE
CERTIFICATE OF CORRECTION

Page 1 of 5

PATENT NO. : 5,036,245
DATED : July 30, 1991
INVENTOR(S) : Kazumasa Ohnishi, et. al.

It is certified that error appears in the above-indentified patent and that said Letters Patent is hereby corrected as shown below:

The Title page showing the illustrative figure should be deleted to be replaced with the attached Title page.

In the Drawings:
Sheets 1-3 of the drawings, consisting of Figs. 1-5, should be deleted to be replaced with the sheets of drawings, as shown on the attached pages.

Signed and Sealed this

Twenty-eighth Day of September, 1993

Attest:

BRUCE LEHMAN

Attesting Officer

Commissioner of Patents and Trademarks

United States Patent [19]
Ohnishi et al.

[11] Patent Number: 5,036,245
[45] Date of Patent: Jul. 30, 1991

[54] ULTRASONIC LINEAR MOTOR

[75] Inventors: Kazumasa Ohnishi; Toru Nakazawa, both of Nagaoka; Yukimitsu Manabe, Niigata, all of Japan

[73] Assignee: Alps Electric Co., Ltd., Tokyo, Japan

[21] Appl. No.: 435,321

[22] Filed: Nov. 13, 1989

[30] Foreign Application Priority Data

Dec. 5, 1988 [JP] Japan .................. 63-158158

[51] Int. Cl.⁵ ........................................... H01L 41/08
[52] U.S. Cl. ........................ 310/323; 310/326; 310/345
[58] Field of Search .................. 310/323, 328, 345

[56] References Cited
U.S. PATENT DOCUMENTS

| | | | |
|---|---|---|---|
| 2,278,966 | 4/1942 | Williams | 310/345 X |
| 3,375,707 | 4/1968 | Neitz | 310/345 X |
| 4,562,374 | 12/1985 | Sashida | 310/323 |
| 4,857,791 | 8/1989 | Uchino et al. | 310/323 X |

FOREIGN PATENT DOCUMENTS 0222466  5/1985  Fed. Rep. of Germany ...... 310/323

Primary Examiner—Mark O. Budd
Attorney, Agent, or Firm—Guy W. Shoup; David W. Heid

[57] ABSTRACT

An ultrasonic linear motor including a traveling member having a columnar leg portion abutting at its one end against a traveling surface, and a piezoelectric element mounted on the traveling member for vibrating the leg portion in a direction intersecting an axis of the leg portion. A cover is provided around the traveling member for covering the traveling member and a protecting member is filled inside the cover in such a manner as to fully cover the piezoelectric element for protecting the piezoelectric element from an external environment, whereby the piezoelectric element can be protected from the external environment, and the separation of the piezoelectric element from the traveling member can be prevented. In another aspect, a protector cover is mounted on the traveling member in such a manner as to extend forwardly beyond the piezoelectric element in a direction of movement of the traveling member, whereby even when the protector cover collides with an external member, the damage of the piezoelectric element can be prevented.

3 Claims, 4 Drawing Sheets